Aug. 15, 1944. H. H. BROWNLEE Re. 22,527

CONTROL OF POWER ACTUATED MACHINERY

Original Filed Jan. 29, 1938 2 Sheets-Sheet 1

INVENTOR
H. HERBERTSON BROWNLEE
BY John G. Roberts
ATTORNEY

Aug. 15, 1944. H. H. BROWNLEE Re. 22,527

CONTROL OF POWER ACTUATED MACHINERY

Original Filed Jan. 29, 1938 2 Sheets-Sheet 2

INVENTOR
H. HERBERTSON BROWNLEE

BY John G. Roberts

ATTORNEY

Reissued Aug. 15, 1944

Re. 22,527

UNITED STATES PATENT OFFICE 22,527

CONTROL OF POWER ACTUATED MACHINERY

Henry Herbertson Brownlee, Washington, D. C.

Original No. 2,313,917, dated March 16, 1943, Serial No. 187,593, January 29, 1938. Application for reissue December 14, 1943, Serial No. 514,291

14 Claims. (Cl. 38—40)

This invention relates to the art of controlling power actuated machinery. It is of special utility in association with machines that operate quickly, repeatedly and with great force as in power presses working on materials of various sorts. It is exemplified herein as applied to a garment press in connection with which it has special advantages. Its objects are simplicity of operation, speed and efficiency of working and security against accidents.

In the laundry and tailoring business numerous types of machines are used for the purpose of ironing and pressing garments after the washing or dry cleaning operations. A common machine for this step is operated by pneumatic force applied to a heated ironing head, or buck, to bring it down and hold it under pressure against a garment that the machine attendant had adjusted upon a padded, and sometimes also heated, lower buck.

To work such a machine it is necessary for the attendant to exercise control of compressed air for the energization of the pneumatic device. Hand operated air valves have been used for this purpose and, to protect the attendant from accidentally operating the press with one hand while adjusting the garment on the lower buck with the other, a dual control system requiring the joint use of two hands to close the press has been resorted to. Under that system the attendant must keep both hands on the air valve controls until the head has been locked in the ironing position. This expedient, however, affords no protection to others should they thoughtlessly intrude the danger zone. As the space between the bucks when the press is open may be approached from all sides, the possibility of such intrusion is a hazard especially in a busy laundry where numerous machines are in operation and many workers are moving about.

A machine equipped according to this invention is safe because it is rendered inoperative, or, if started, is immediately restored, by the mere presence near its working parts, or by the approach thereto from any direction, of the attendant or of any other person or body of like capacity. Simplicity of operation, speed and efficiency are secured because it is only necessary for the attendant to step away from the machine in order to cause the power to be applied and whereby on the attendant's return and, in the application of the invention to a garment press, on either such return or the drying of the garment in the press, whichever happens first, the power is disabled and the machine is restored to its normal position in readiness for a subsequent operation.

The invention serves with special advantage where the operation of a group of machines is supervised by a single attendant. By placing the machines in line or arranging them about a central area the attendant is free immediately after preparing one machine for operation to pass to the next in line and so on in rapid succession. The movements can be so timed that when the last machine has been attended to the work in the first is finished.

These and other desirable characteristics of the invention are secured by the maintenance within a space surrounding the machine, or each machine of a group, or the danger zone thereof, of a field of energy sensitive to the movement into and out of it of external bodies, and by suitable power applying and power disabling controlling apparatus responsive to the resulting energy effects. Power disablement is also provided on failure of the controlling apparatus to function normally. In presses for ironing damp garments, the controlling apparatus is caused to be responsive to maintain and then to disable the power by and with the aid of suitable devices sensitive to the moisture content of the garments themselves or to other effective evidence of the completion of the ironing operations.

Figure 1:
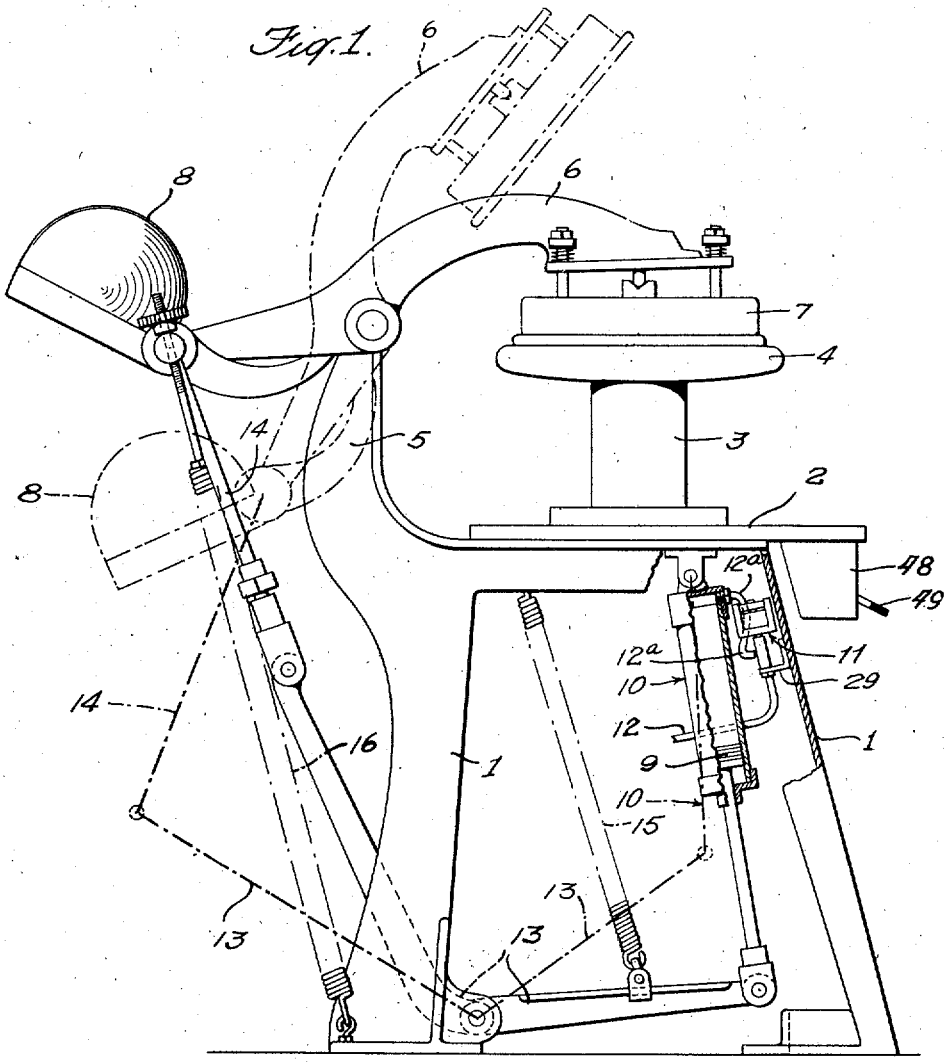
Fig. 1 is a side elevation of a garment pressing machine.

The press base or frame 1 supports a table-like top 2, on which is mounted a goose neck support 3 for a lower or padded buck 4. An upwardly extending bracket 5 supports a rocker arm 6, which carries at its forward end an upper or ironing buck 7. A rearward extension of this arm carries a counterweight 8 and is connected to the piston 9 of a pneumatic cylinder 10 by a system of levers working on the toggle principle. The heating of the ironing buck is commonly provided for by a system of steam pipes, and channels within the buck, not shown. In Fig. 1 the movable parts are shown by full lines in the closed position of the press and by dotted line in the open or normal position.

Figure 2:
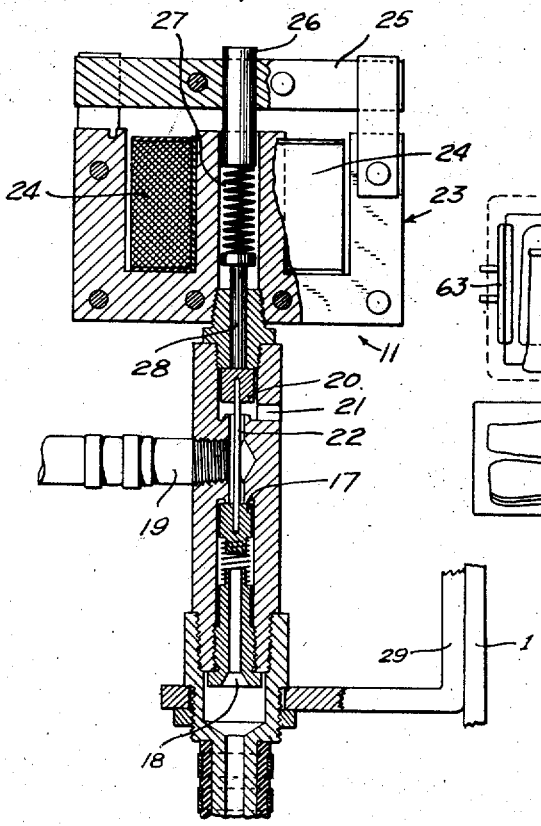
Fig. 2 is a vertical cross section of a magnetic air valve.

A magnetic air valve 11 Fig. 2 is mounted alongside the pneumatic device and serves when energized to open the cylinder above the piston to a compressed air source through a duct 12. When the air is thus let in the piston descends pushing down on one arm of a bell crank 13 and, at the end of its stroke, bringing the other arm almost into alignment with the link 14, thereby greatly adding to the force exerted on the garment. On the release of the air the retractile springs 15, 16 aided by the counterweight 8 open the press.

The valve provides for a short passage for the compressed air through the duct 12a to the cylinder 10 and, therefore, for quick action both in closing and opening the press. This valve has two plugs, better shown in Fig. 2, one, 17, normally closing the inlet 18 to the outlet 19 leading to the cylinder. The other 20, is normally in open position to an exhaust outlet 21. The plugs are joined by a spacer pin 22. A magnet 23 when energized by electric current in its coil 24 attracts the armature 25 which depresses a plunger 26 against a spring 27 which in turn presses down a second plunger 28 to close the valve 20 and to open it at 17. The reverse action occurs when the magnet is deenergized. This structure may be supported by a bracket 29 to the base or frame 1.

Figure 3:
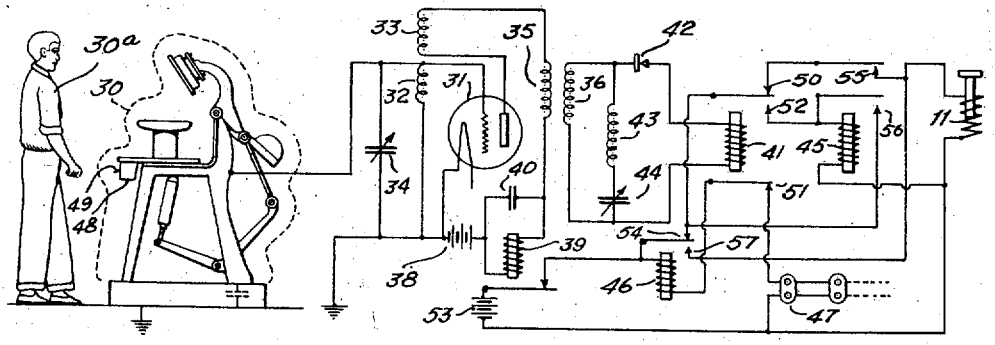
Fig. 3 is a diagrammatic representation of a system of controlling circuits.

In the circuit diagram Fig. 3 the garment press is shown in general outline with the figure of an attendant 30a standing by. A protecting and controlling field of energy is indicated by the space 30 within the dotted line surrounding the press. This space by suitable adjustments is effective to a depth of several inches and may be limited, if desired, to a zone near the dangerous working parts. The press should be supported a few inches above the floor, as shown, or it may be otherwise insulated from ground or an insulated screen adjoining the press may be utilized to define the field of energy, in which latter case the press may be grounded.

A convenient way to generate this field of energy is to provide an oscillator of high frequency which may be several hundred kilocycles, and such oscillator may be of any known type. As shown it is of the three element vacuum tube type 31 having input and output coils 32, 33, inductively coupled. In the input circuit the coil 32 and condenser 34, together with the condenser effect of the insulated press itself, or its protecting screen, form a tuned circuit determining the normal frequency at which the tube will oscillate. In the output circuit of the oscillator are the primary coil 35 of a transformer, the usual B battery 38, or other equivalent source of current, and a protection relay 39 shunted by a condenser 40. In circuit with the secondary coil 36 of the transformer is a relay 41 in series with a rectifier 42, which may be the copper oxide type. This relay is shunted by a tuned circuit comprising an inductance 43 and condenser 44. Relay 41 controls a locking relay 45 and these two relays jointly control the operation of the magnetic air valve 11. Also controlling the circuit of the magnetic air valve and the circuit of the locking relay 45 is a release relay 46 the coil of which is in series with one or more garment moisture controlled switches 47. The oscillator and the other parts of this circuit arrangement, except the magnetic air valve 11 and the garment moisture controlled switches 47, may be assembled in a box or container 48 (see Figs. 1 and 3) mounted on the frame of the press beneath the front edge of its table. On the outside of this box or container a switch handle 49 may be provided for manual control in placing the oscillator in and out of operation. The oscillator starting equipment is not detailed but may be arranged according to standard engineering practice. This entire circuit diagram typifies one of many controlling arrangements suitable for carrying out the operating features of the invention.

Assuming the oscillator has been started and the field of energy around the press established, the operation is as follows: Normally, with the attendant 30a, and all other external bodies of ample capacity, outside the energized space, the oscillations generated are adjusted to be such that in the output circuit the tuned shunt 43, 44 offers a low impedance to current flow and relay 41 receives insufficient current for its energization. When, however, the attendant approaches the press for the purpose, say, of adjusting a garment therein the capacity of the input circuit of the oscillator is increased, in consequence of which the frequency of the oscillations is changed—in this case lowered. At such lowered frequency the tuned shunt 43, 44 offers a higher impedance to the current from the coil 36. Relay 41 thereupon attracts its armature, opens contacts 50 and 51 and closes contact 52. As the protection relay 39, at such times as the oscillator is working, is energized by the B battery 38 there is now a closed circuit from battery 53 through the back contact 54 of release relay 46, front contact 52 of relay 41 and the coil of relay 45 which relay thereupon closes its contacts 55 and 56. This relay 45 is now locked in a circuit from battery 53 through the contact of relay 39, back contact 54 of relay 46 and its own contact 56.

Figure 6:
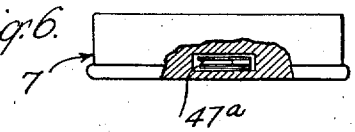
Fig. 6 is an end view of an alternative ironing head, partly in section, equipped with a thermostatic device.
Figure 5:
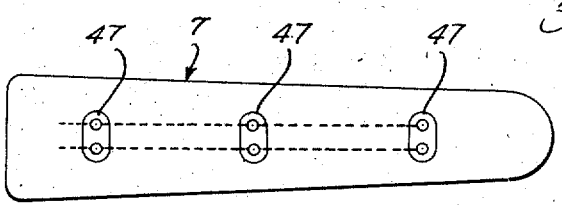
Fig. 5 is a plan view, in outline, of a typical ironing head showing an effective location of a plurality of auxiliary devices for determining the duration of the ironing period of damp garments.

The attendant having adjusted the garment steps away from the press thereby removing her body from the energized field 30 whereupon the normal frequency of the oscillator is restored and the tuned circuit 43, 44 again effectively shunts current from relay 41. This relay 41 thereupon is deenergized and its normal contacts 50 and 51 become again closed. Now the magnetic air valve is in a closed circuit from the battery 53 through contact of relay 39, back contact 54 of relay 46, back contact 50 of relay 41 and front contact 55 of relay 45. This causes compressed air to be applied to close the press. If during the descending movement of the press any external object such as the attendant or another person enters the field 30 the press will immediately be released by the opening of the circuit of the air valve at contact 50 of relay 41. Without such outside influence, however, the press closes and the air valve comes under control of the garment switches 47 (Fig. 5), or 47a (Fig. 6), which will close, effectively, by reason of current flow through the moisture of the garment, when placed flush with the ironing head as in Fig. 5, or, likewise, by reason of the cooling effect of the garment, if thermostatically sensitive and placed in a compartment just above the ironing surface as in Fig. 6. One or more of these garment switches now closes its contact, due to the moisture or cooling effect of the garment, and relay 46 is energized in a circuit from battery 53, through contact of relay 39 one or more of the closed switches 47 and back contact 51 of relay 41. The closure of contact 57 of relay 46 provides an independent path from the battery 53 to the coil of the magnetic air valve 11. In this operation relay 46 also opens contact 54 releasing the locking relay 45. In a few seconds the reverse operation of the switches 47, or 47a, takes place due to the drying, or heating of the garment, releasing relay 46 and opening the circuit of the air valve. This causes the release of the press and the lifting of its ironing head. The garment is now properly dried and ironed and the press is ready for another operation.

The protection relay 39, which, as stated, becomes energized when the oscillator is in operation, will release, opening all circuits fed by the battery 53 and thus disable the power for the press, on any failure of normal operation of the oscillator.

Figure 4:
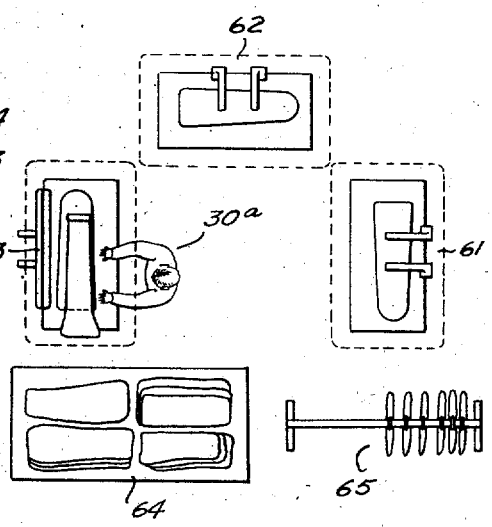
Fig. 4 is a diagrammatic plan view of a group of machines.

A convenient arrangement for the control of a group of three presses 61, 62 and 63 is shown in Fig. 4. The attendant 30a, having adjusted a garment in press 61, left it to automatically close, adjusted another in press 62 and left it with like result, is here shown in the act of adjusting a third garment in press 63. On leaving the latter, it, too, will automatically close and, due to an appropriate time schedule of operations, press 61 will have opened or be about to open, whereupon the cycle of operations, as stated, may forthwith be repeated. At the left of the attendant is a table 64 for a supply of damp garments and a rack 65 for supporting garments that have been ironed and dried.

I claim:

1. A power operated garment press, means for maintaining within a space adjoining the press a field of energy sensitive to movements relative thereto of external bodies, a device responsive to the moisture content of a garment in the press, and power applying and disabling means under the joint control of said energy maintaining means and said device and rendered effective to close the press only upon the movement of such a body from a position within to a position outside of said space and to open the press either upon the movement of such a body from the position outside to a position within said space or upon a certain reduction of the moisture content of said garment.

2. A press having coacting members for ironing garments and the like, power mechanism for closing the press, and a controlling system for said power mechanism including an electric generator adapted to maintain within a space surrounding the machine a field of energy and being sensitive in its energy output to the movement of external bodies in said space, and including means in the vicinity of at least one of said members to set up a condition sensitive to the moisture content of a garment in the press, apparatus associated with said generator and responsive to variations in the energy output thereof for controlling the application of power to close said press, and apparatus associated with said moisture sensitive means and responsive to variations in the condition thereof for controlling the disabling of power to open said press.

3. A textile press comprising a stationary buck member, a pivoted pressing head member, fluid power motor means to actuate said head member, a valve to control said fluid motor means, means to produce an electric field in the vicinity of said members, a balanced electrical circuit having two conditions of balance, means to cause said circuit to change from one condition of balance to the other when a body of a predetermined nature passes into and out of said field, and means controlled by the condition of the circuit to actuate said valve to control the movement of the press head member.

4. A textile press comprising two pressing members, one of which is movable towards and away from the other, fluid power motor means to actuate said movable member, an electrically actuated valve to control said fluid motor means, an electric system including a thermionic device with a control grid and a conductor extending from said grid to the press, said system producing an electric field in the vicinity of said members and having two conditions of operation, said thermionic device being sensitive to said field and causing the system to change from one condition of operation to the other when a body of a predetermined nature passes into and out of said field, and a relay controlled by the condition of the system to cause the actuation of said valve to control the movement of the movable press member.

5. A textile press comprising a stationary buck member, a pivoted head member, fluid power motor means for actuating said head, a valve for controlling said head member, an electromagnet for controlling said valve, an electrode insulatedly mounted on one of said members, a conductive path for said electrode subject to resistance variation when said head member is actuated, said electromagnet being adapted when energized to actuate said valve to move said head member towards the buck member and when deenergized to actuate said valve to move the head member away from the buck member, means controlled at will to cause the initial energization of said electromagnet, and means controlled automatically in response to the variation of resistance in said conductive path to temporarily maintain the energization of said electromagnet to hold the head member down on the buck member and finally to cause the deenergization thereof to move said head member away from the buck member.

6. A textile press comprising two pressing members, one of which is movable towards and away from the other, fluid power motor means to actuate said movable member, a valve for controlling said motor means, an electrode insulatedly mounted on one of said members, a conductive path for said electrode subject to resistance variation when said movable member is actuated, operator controlled means to actuate said valve to move said movable member toward the other member, an electric circuit having two conditions of operation, and means responsive to the variation of resistance in said conductive path to cause the said circuit to change from one condition of operation to the other to actuate said valve to move said movable member away from the other member.

7. A textile press comprising two pressing members, one of which is movable towards and away from the other, fluid power motor means to actuate said movable member, a valve for controlling said motor means, an electrode insulatedly mounted on one of said members, a conductive path for said electrode subject to resistance variation when said movable member is actuated, a system of electric circuits having two conditions of operation for controlling said valve, operator controlled means to cause said system to change from one condition of operation to the other to open said valve to move said movable member towards the other member, and means in said system to render the system responsive to the variation of resistance in said conductive path to close said valve to move said movable member away from the other member.

8. A textile press comprising two pressing members, one of which is movable towards and away from the other, fluid power motor means to actuate said movable member, an electrode insulatedly mounted on one of said members, a conductive path for said electrode subject to resistance variation when said movable member is actuated, a system of electric circuits having two conditions of operation for controlling said valve, operator controlled means to cause said system to change from one condition of operation to another to open said valve to move said movable member towards the other member, and means in said system to render the system responsive to the variation of resistance in said conductive path temporarily to maintain said valve open to hold said movable member down upon the other member and finally to close said valve to move said movable member away from the other member.

9. A machine having two work members, one of which is movable into and out of engagement with the other, motor means to actuate said movable member, an electrode insulatedly mounted on one of said members, a conductive path for said electrode subject to resistance variation when said movable member has been moved into engagement with the other member, electroresponsive means adapted when energized to actuate said motor means to move said movable member into engagement with the other member and when deenergized to move said movable member out of such engagement, means controlled at will to cause the energization of said electroresponsive means, and means controlled automatically in response to the variation of resistance in said conductive path to cause the deenergization of said electroresponsive means.

10. A machine, power means for working said machine, an electric generator, electroresponsive means under the control of said generator and controlling in turn the application of said power means to said machine, and conducting means extending from said generator to said machine, said generator with the aid of said conducting means maintaining within a space surrounding said machine a field of electrostatic energy sensitive to movements of external bodies in said space, and said generator being reactively sensitive to said field and responding upon a predetermined change in the energy thereof caused by such a movement to effect an operation of said electroresponsive means to work the machine and upon another such predetermined change to effect an operation of said electroresponsive means to stop the working of the machine.

11. A garment press, power means for closing and opening said press, an electric generator for controlling the application of said power means to said press, conducting means extending from said generator to said press, said generator with the aid of said conducting means maintaining within a space surrounding the press a field of electrostatic energy sensitive to movements of external bodies in said space, said generator being reactively sensitive to said field and responding upon a predetermined change in the energy thereof caused by such a movement to effect an operation of said power means to close the press, and controlling means associated with a garment in the press and sensitive to the moisture content thereof, said controlling means being responsive upon a predetermined reduction of the moisture in the garment to effect an operation of said power means to open the press.

12. A machine, power means for working said machine, an electric generator, electroresponsive mechanism under the control of said generator and controlling in turn said power means, and conducting means extending from said generator to said machine, said generator with the aid of said conducting means maintaining within a space surrounding said machine a field of electrostatic energy sensitive to movements of external bodies into and out of said space, said generator being reactively sensitive to said field and responding upon a predetermined change in the energy thereof caused by the movement of such a body out of said space to effect an operation of said mechanism to work the machine and responding upon another predetermined change in the energy thereof caused by the entrance of such a body to said space to effect a second operation of said mechanism to stop the working thereof.

13. A textile press comprising a stationary buck member, a pivoted pressing head member, means to actuate said head member, a device to control said actuating means, means to produce an electric field in the vicinity of said members, a balanced electrical circuit having two conditions of balance, means to cause said circuit to change from one condition of balance to the other when a body of a predetermined nature passes into and out of said field, and means controlled by the condition of the circuit to actuate said device to control the movement of the press head member.

14. A textile press comprising two pressing members, one of which is movable towards and away from the other, means to actuate said movable member, an electrically actuated device to control said actuating means, an electric system including a thermionic device with a control grid and a conductor extending from said grid to the press, said sysem producing an electric field in the vicinity of said members and having two conditions of operation, said thermionic device being sensitive to said field and causing the system to change from one condition of operation to the other when a body of a predetermined nature passes into and out of said field, and a relay controlled by the condition of the system to cause the actuation of said electrically actuated device to control the movement of the movable press member.

HENRY HERBERTSON BROWNLEE.